United States Patent [19]

Chen et al.

[11] Patent Number: 5,727,483
[45] Date of Patent: Mar. 17, 1998

[54] ROTARY KILN INCINERATOR

[76] Inventors: Kang-Shin Chen; Chung-Hsing Wu, both of P.O. Box 55-175, Taichung, Taiwan

[21] Appl. No.: 805,698

[22] Filed: Feb. 25, 1997

[51] Int. Cl.⁶ .................................................. A47J 36/00
[52] U.S. Cl. ................... 110/246; 432/106; 432/118; 432/108; 110/257; 110/258
[58] Field of Search .................................. 110/226, 246, 110/257, 258; 432/105, 106, 108, 118

[56] References Cited

U.S. PATENT DOCUMENTS

| | | | |
|---|---|---|---|
| 3,228,670 | 1/1966 | Moklebust | 432/108 |
| 5,207,009 | 5/1993 | Thompson et al. | 432/108 X |
| 5,297,494 | 3/1994 | Kim et al. | 110/246 X |
| 5,301,619 | 4/1994 | Keersmaekers | 110/246 |
| 5,628,126 | 5/1997 | North | 432/105 X |

*Primary Examiner*—Henry A. Bennett
*Assistant Examiner*—Susanne C. Tinker

[57] ABSTRACT

A rotary incinerator for disposal of industrial waste is provided. The incinerator is slopedly and rotatably disposed to a slant support and has a plurality of spirally arranged tubular conveying ribs on entire inner periphery for squeezedly transmitting the incinerating waste from the lower portion to an exit in the tapered upper end so that the waste is stirred while incinerating and the slag and ash are automatically discharged via the exit, a combustion system worked together with a ventilation system at a lower end for supplying the flame and the fresh air into the incinerator, a drive system for driving the incinerator to rotate and a control device for controlling the operation of the above recited elements. The improvement is characterized in safe and rapid incineration of the industrial waste, therefore, economical.

3 Claims, 2 Drawing Sheets

5,727,483

ROTARY KILN INCINERATOR

BACKGROUND OF THE INVENTION

The present invention relates to heat incinerating devices and more particularly to a rotary kiln incinerator which suitable to dispose the industrial waste by incineration in rotation. The waste is fed in through a spiral channel and the fresh air enters into a combustion chamber via a ventilator system so that the waste is completely incinerated under stir and the feed, incinerating and discharging of the waste can be processed consistently in order to promote its efficiency and to reduce the cost at disposal of the industrial waste.

Prior art incinerator is of a stationary structure which is composed of a cylindrical or cubical furnace, a combustion device disposed under the furnace and a fire hearth positioned therebetween for discharging the slag, ash and carbide carbon from the furnace. Since the fresh air is indispensable in supporting the combustion, so that a plurality of vents are prepared on the lower portion of the furnace. However, the waste or garbage is charing in heaps in this incinerator, so that the waste inside the heap is forbad from the fresh air and could not be combustion until that those on the surface has been burnt out and peeling off. This is a great disadvantage of the prior art incinerator which couldn't dispose rapidly a large amount of the waste. Besides, the slag and ash need to remove from under the furnace manually, thus uneconomical.

Although, a conveyor is adaptable to transmit the slag and ash out of the furnace, it is a great risk if any kindling material such as a spark is brought out with the ash that may cause fire. Besides, a slag discharging equipment is so often in engine trouble and difficult to maintain.

Moreover, the vents formed in the lower wall of the furnace are easily to block with solid waste that obstructs the fresh air from entering into the furnace and the consequence is that the incompletely burnt waste will cause second contaminate to the perimeter environment.

SUMMARY OF THE PRESENT INVENTION

The present invention has a main object to provide a rotary kiln incinerator in which-a spiral channel is provided to feed the waste which will be dehumidified at fore portion of the channel and burnt out at a rear portion thereof. Since that the waste is completely stirred up during the incineration process, the working efficiency is greatly promoted so as to reduce the cost to operate.

Another object of the present invention is to provide a rotary kiln incinerator which includes a novel ventilation system integral with the spiral channel and every conveying rib of the channel has the air ingresses therein so that the fresh air enters everywhere in the entire furnace in order to completely burn out the waste. The conveying ribs are rotated in concert with the furnace and move the waste forward in the manner of coaction, where the positions of the air ingresses are variable upon the rotation of the furnace which not only facilitates the stirring out up of the waste but also prevents the air ingress from blocked with waste so as to be helpful to a perfact incineration of the waste.

Still another object of the present invention is to provide a rotary kiln incinerator in which the fresh air, when enters through a space defined by a pair of cylinder casings therebewteen, is preheated by absorbing the expellant heat from hereto so that the preheated fresh air increases the interior temperature of the furnace and reduces the fuel consumption.

Further object of the present invention is to provide a rotary kiln incinerator which has a sloped rotatable furnace to facilitate the slag and ash discharged automatically from the upper end thereof.

Accordingly, the rotary kiln incinerator of the present invention comprises generally a power source, a incineration device, wherein the incinerator is slopedly and rotatably engage with an axis which has an elongate line of non-horizontal and non-vertical. A perimeter drive system connects to the power source and the axis therebetween for actuating the incinerator to rotate under control.

Further features and advantages of the present invention will become more fully understood by reference to the following detailed description thereof when read in conjunction with the attached drawings.

DETAILED DESCRIPTION OF THE PREFERRED EMBODIMENT

Figure 1:
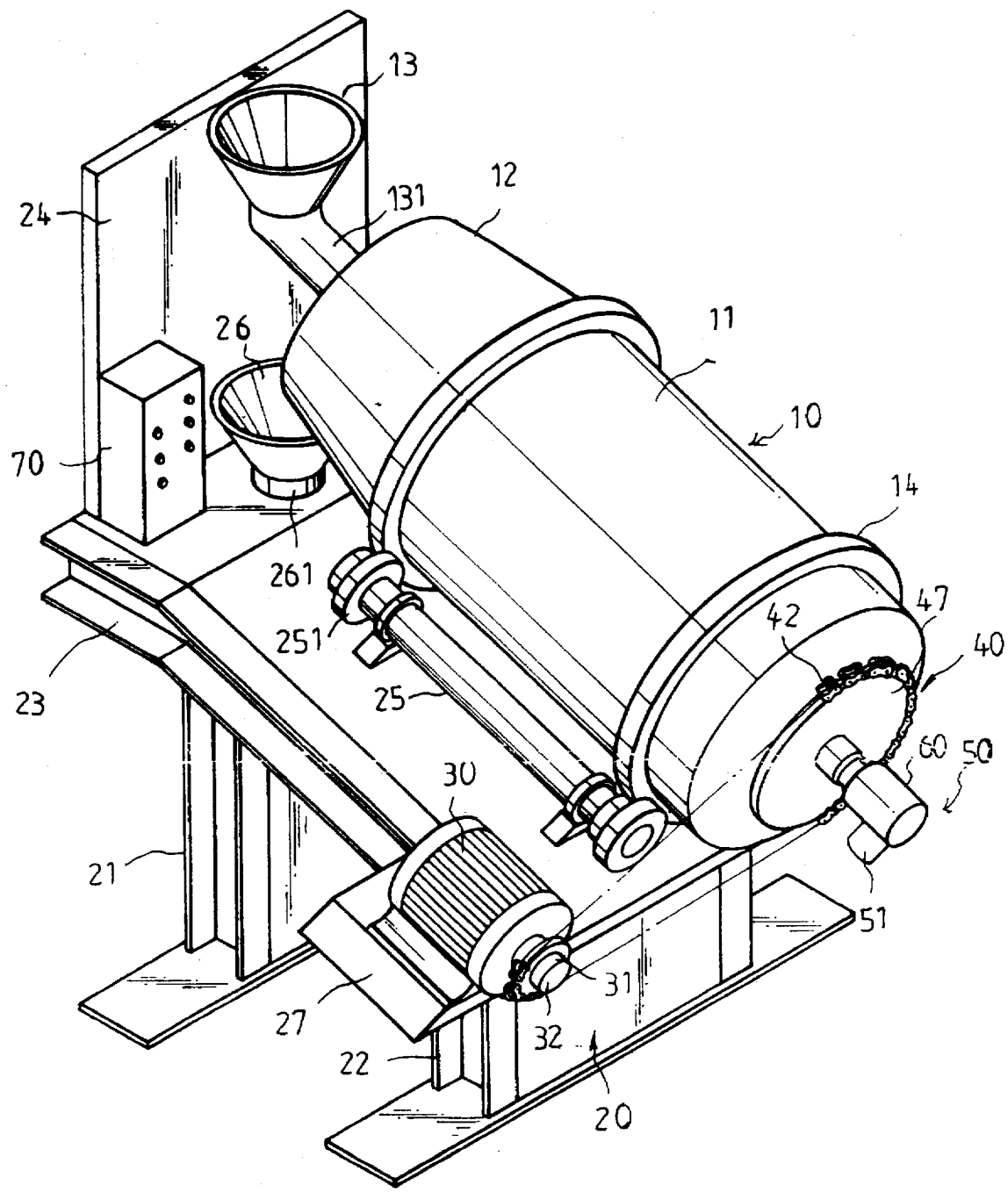
FIG. 1 is a perspective view to show a preferred embodiment of the present invention.
Figure 2:
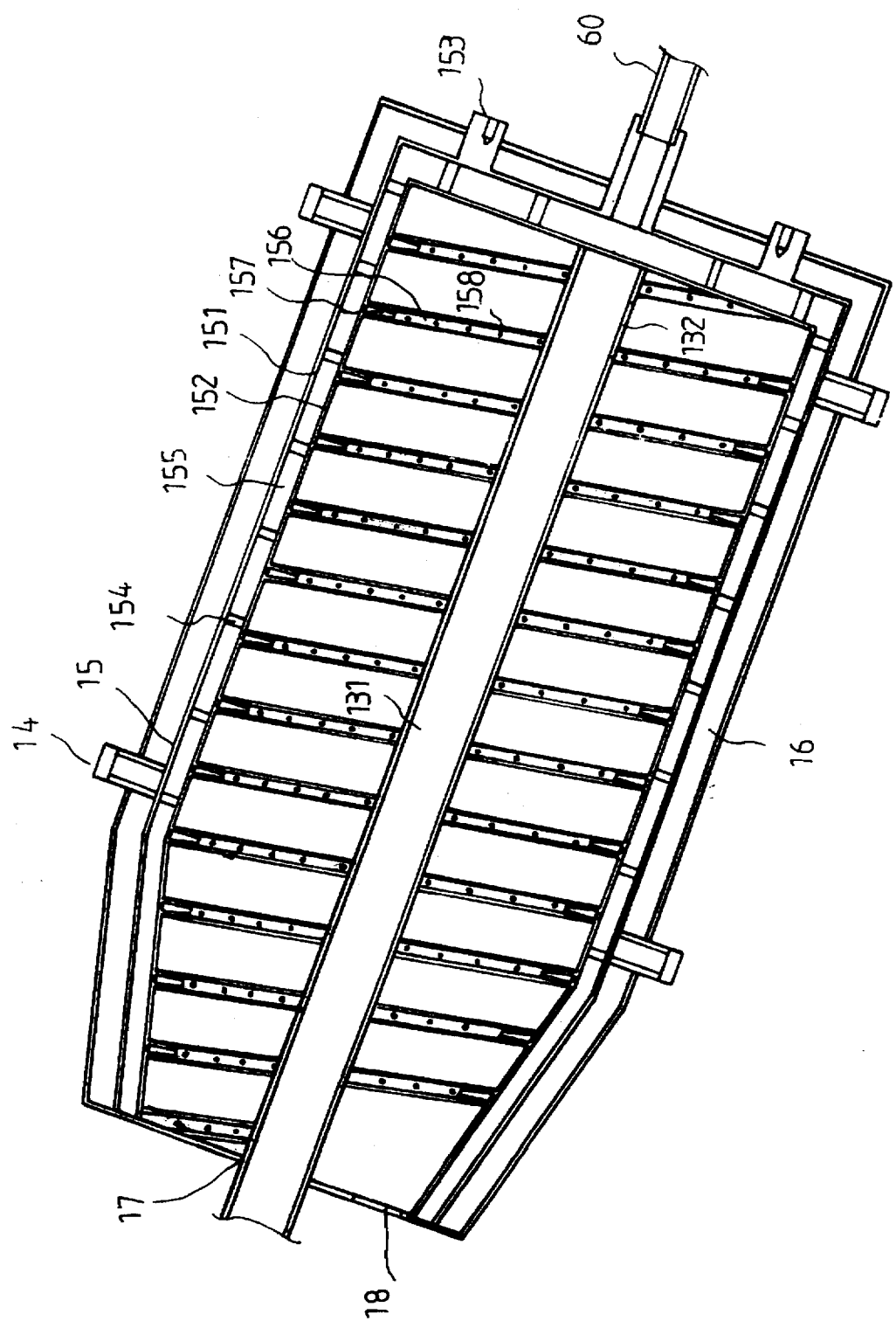
FIG. 2 is a sectional view to show the interior arrangement of the incinerator of FIG. 1.

Referring to FIGS. 1 and 2 of the drawings, the rotary kiln incinerator of the present invention comprises generally a incinerator 10, a support 20, a power source 30, a drive system 40, a ventilation system 50, a combustion system 60 and a control device 70.

The incinerator 10 is comprised of a hollow cylindrical housing 11 having a tapered end 12 towards a first funnel member 13, a pair of annular ribs 14 integrally formed spaced apart and through a periphery of the housing 11, a furnace 15 spacedly enclosed in the housing 11 having a shape in configuration with that of the housing 11 and engaged with the inner periphery of the ribs 14 and secured to a plurality of the connectors 153 at the bottom so as to define a first space 16 therebetween. The furnace 15 includes a pair of first and second casings 151 and 152 spacedly superposed together and integrated by a plurality of cylinder ribs 154, wherein the inner diameter of the first casing 151 is slightly larger than the outer diameter of the second casing 152 so that a second space 155 is defined therebetween and communicating with the ventilation system 50, a plurality of tubular conveying ribs 156 spirally and spacedly arranged on the entire inner periphery of the second casing 152 each has an air ingress 157 and a plurality of spiracles 158 spacedly formed in the periphery and communicating with the second space 155 for inducing the fresh air into the furnace 15. It is understood that when the fresh air is blown into the second space 155 via the ventilation system 50 will be preheated prior to enter into the furnace because of that the casings 151 and 152 are heated at a high temperature after the commencement of the incinerator 10. This arrangement provides a great advantage of reducing the consumption of the fuel. Besides, the first space 16 between the housing 11 and the furnace 15 is prepared as an insulator to prevent the heat in the casing 151 from radiated out of the housing 11. Further, the two ends of the housing 11 is substantially enclosed except a pair of openings in the bottom for communicating the fresh air into the second space 155 and the flame into the furnace 15, and an entrance 17 together with an exit 18 in the tapered end 12.

The support 20 includes a pair of stands 21 and 22 at different height, a flat rectangular platform 23 slopedly disposed on the stands 21 and 22, an upright portion 24 for securing the first funnel member 13 and for preventing the heat or ash from escaped from the support 20 projected upward of a higher end of the platform 23, a pair of cylindrical racks 25 rotatably and parallel disposed on the upper surface of the platform 23 for slopedly supporting the incinerator 10, each has a pair of rotatable stepped wheels axially secured to two ends engageable with the annular ribs 14 of the housing 11, a second funnel member 26 located at a center of the platform 23 adjacent the upright portion 24 including a pipe 261 extended downward through the platform 23 for receiving and discharging the slag and ash from the exit 18 of the housing 11, a power source such as a motor 30 disposed on an extension 27 laterally extended from the lower end of the platform 23, the motor 30 has a first gear 31 axially secured to an outward end of an axis 32 and connected to a second gear 41 via a chain member 42 of the drive system 40, and a control device 70 for electronically controlling the operation of the elements wholly disposed at the upper end of the platform 23 abutting one side of the upright portion 24. The combustion system 60 is also axially disposed at the lower end of the incinerator 10 including nozzles and external fuel source (not shown) which provide sufficient flame to incinerate the waste inside furnace 15. The ventilation system 50 further has an external blower (not shown) supplying the compressed fresh air into the second space 155 via the lower end also. The first funnel member 13 which is prepared for feeding the industrial waste into the furnace 15 and stationarily disposed to the inward side of the upright portion 24 includes an elongate pipe 131 extended inwardly into the furnace 15 via the entrance 17 at the center of the tapered end 12 and pivotally secured to the axis at the lower end of the housing 11. The elongate pipe 131 has an egress 132 at an under side in the proximity of the forward end for delivering the waste into the lower portion of the furnace 15 (as shown in FIG. 2).

In operation, feed the industrial waste into the first funnel member 13 at first, the waste will slide through the elongate pipe 131 downward under gravity and for the inclination of the pipe 131 so as to automatically deliver the waste into the lower portion of the furnace 15 via the egress 132, and turn secondly both the ventilation system 50 and the combustion system 60 on to begin the incineration process, and then turn on both the drive system 40 and the control device 70, so that the incinerator 10 works steadfastly under control.

When the temperature increases at certain degree, the compressed fresh air, when passes through the second space 155 is preheated prior to enter into the furnace 15 and intensifies the combustion result. The tubular conveying ribs 156 which are spirally and spacedly arranged on the inner periphery of the furnace 15 and are under counterclockwise rotation of the incinerator 10 will squeeze and lead the combustioned waste moving upward toward the exit 18 from where the slag and ash are discharged into the second funnel member 26 for further disposal. Note that the waste in the upper portion of the furnace 15 is still effectively incinerated when the temperature in the furnace 15 raises to a certain high degree. The large piece of the slag which may not be smoothly poured out of the exit 18 will return under the gravity back to the lower portion of the furnace 15 for re-incinerating with others and finally squeezed out of the exit 18 with others.

When the temperature in the furnace 15 becomes higher than a maximum degree or lower than a minimum degree, the control device 70 will act to automatically turn off the combustion device 60 or intensify the flame of combustion. Since the waste is incinerated under rotation and stirring of the spiral tubular conveying ribs 156, the incineration capability of this incinerator 10 is extremely greater than that of the prior art incinerator.

If any hazard comes inadvertently, all the systems be stopped by the control device 70 immediately to prevent the machine as well as the operator from any damagement.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A device for incinerating industrial waste comprising:

an incinerator slopedly and rotatably disposed on a pair of cylinder racks which are rotatable and secured parallel to an upper surface of a sloped platform disposed on a support member, the incinerator including a hollow cylinder housing having a tapered upper end, an enclosed lower end, first and second central bores formed in the upper and lower ends, respectively, an exit radially formed in the upper end adjacent to the first central bore and a pair of annular ribs integrally formed and spaced apart around an outer periphery of the housing for rotatably engaging with a plurality of stepped wheels which are axially secured to two ends of the cylinder racks and a furnace concentrically disposed within the housing and connected to the housing by the pair of annular ribs so as to define a first annular space thereinbetween for heat insulation purposes, said furnace having a shape being configured with that of the housing and including first and second casings spacedly engaged by a plurality of cylinder ribs so as to define a second space between the first and second casing which communicates with an external ventilation system and the interior of said second casing for preheating the fresh air while passing therethrough, a plurality of tubular conveying ribs spirally and spacedly arranged on entire inner periphery of the second casing said ribs each having an air ingress and a plurality of spiracles spacedly formed in the periphery thereof supplying for the preheated fresh air from said second space into the furnace, a first funnel member stationarily secured to an upright member secured at an upper end of the sloped platform for feeding the industrial waste into the interior of the furnace, the funnel ending in an elongate pipe inserted into the furnace via the first central bore and pivotally engaged with an axis at the second central bore at the lower end thereof, including an egress adjacent the lower end for delivering the waste into the furnace;

said support member further including first and second stands of different height for slopedly supporting the platform, a second funnel member upwardly disposed on a central upper surface of the platform and under the exit of the tapered upper end of the housing and including a pipe extended to an under side of the platform for discharging slag and ash from the exit, a power source disposed on an upper surface of an extension laterally extended from the platform having a drive system including a first gear axially secured to an axis of a motor and connected via a chain means with a second gear which is axially secured to the axis of the housing for counterclockwise rotating of the housing;

a combustion system communicating with the interior of the furnace via a hollow cylinder perpendicular to the second central bore therethrough at the lower end of the housing including an external fuel source engaged therewith;

whereby said incinerator rotatably and slopedly incinerates the industrial waste therein and automatically discharges the slag and ash to the second funnel member via the exit in the upper end of the housing.

2. The device as recited in claim 1 wherein said ventilation system is disposed together with said combustion system including an external air blower connected therewith.

3. The device as recited in claim 1 further has a control device locates at an upper end of the platform abutting the upright portion thereof for controlling the operation of the above recited elements of said device.

* * * * *